US012718656B2

(12) United States Patent
Russ et al.

(10) Patent No.: US 12,718,656 B2
(45) Date of Patent: Aug. 25, 2026

(54) PROVIDING LIVE DEALERS TO REMOTELY LOCATED TABLE GAMES

(71) Applicant: IGT, Las Vegas, NV (US)

(72) Inventors: Michael Russ, Graz (AT); David Froy, Lakeville-Westmorland (CA); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 241 days.

(21) Appl. No.: 18/441,226

(22) Filed: Feb. 14, 2024

(65) Prior Publication Data

US 2025/0259504 A1 Aug. 14, 2025

(51) Int. Cl.
*G07F 17/32* (2006.01)
*G03H 1/00* (2006.01)

(52) U.S. Cl.
CPC ....... *G07F 17/3225* (2013.01); *G03H 1/0005* (2013.01); *G07F 17/322* (2013.01)

(58) Field of Classification Search
CPC ............... G07F 17/322; G07F 17/3211; G07F 17/3225; G03H 1/0005
See application file for complete search history.

(56) References Cited

U.S. PATENT DOCUMENTS 6,508,709 B1 * 1/2003 Karmarkar ............. G07F 17/32 463/40
7,429,117 B2 * 9/2008 Pohlert .................. H05B 45/20 362/11
8,727,892 B1 * 5/2014 Chun .................. G07F 17/3225 463/40
9,390,592 B2 * 7/2016 Chun ...................... G07F 17/34
9,838,661 B2 * 12/2017 Benson .................. G06V 10/28
10,249,132 B2 * 4/2019 Hutchinson-Kay .......................... G07F 17/3288
11,562,621 B2 * 1/2023 Yee ...................... G07F 17/3293
11,699,322 B2 * 7/2023 Andres ............... G07F 17/3267 463/13
2001/0003099 A1 * 6/2001 Von Kohorn ........ H04N 7/0806 463/16
2003/0003997 A1 * 1/2003 Vuong ................ G07F 17/3239 463/42
2004/0224777 A1 * 11/2004 Smith ....................... A63F 1/00 463/47
2005/0020358 A1 * 1/2005 Cram ...................... G07F 17/32 463/31

(Continued)

OTHER PUBLICATIONS

"ARHT Hologram Technology," Electronics & Engineering Pte Ltd © 2021, https://enepl.com.sg/product/arht-holographic-projections/ 7 pages.

*Primary Examiner* — Chase E Leichliter
(74) *Attorney, Agent, or Firm* — Spencer Fane LLP; William M. Kelly

(57) ABSTRACT

Game information for a wagering game is received from a remote gaming table. Live actions by a live dealer for the wagering game are captured by an image capture device. Image information based on the captured live actions are transmitted to the remote gaming table to provide a live holographic image of the dealer at the remote gaming table. An input device receives game input from the live dealer and game instructions based on the game input are transmitted to the remote gaming table to execute game actions at the remote gaming table to generate a game result for the wagering game.

20 Claims, 13 Drawing Sheets

(56) References Cited

U.S. PATENT DOCUMENTS

| | | | | |
|---|---|---|---|---|
| 2005/0059491 A1* | 3/2005 | Oh | G07F 17/3276 | 463/42 |
| 2006/0022214 A1* | 2/2006 | Morgan | H05B 45/40 | 257/E25.032 |
| 2006/0098286 A1* | 5/2006 | Sagar | C03C 12/02 | 359/530 |
| 2006/0114356 A1* | 6/2006 | Didow | G03B 15/07 | 396/3 |
| 2006/0178182 A1* | 8/2006 | Sines | A63F 3/00157 | 463/12 |
| 2008/0220849 A1* | 9/2008 | Wadleigh | G07F 17/32 | 463/31 |
| 2008/0300034 A1* | 12/2008 | Savage | G07F 17/322 | 463/11 |
| 2009/0124379 A1* | 5/2009 | Wells | G07F 17/32 | 463/31 |
| 2009/0238378 A1* | 9/2009 | Kikinis | H04N 13/296 | 381/92 |
| 2009/0303593 A1* | 12/2009 | Sagar | H04N 5/275 | 428/323 |
| 2010/0121808 A1* | 5/2010 | Kuhn | G06N 20/00 | 463/43 |
| 2010/0137064 A1* | 6/2010 | Shum | A63F 13/428 | 463/36 |
| 2011/0157297 A1* | 6/2011 | O'Connell | H04N 19/132 | 348/E7.083 |
| 2012/0094737 A1* | 4/2012 | Barclay | G07F 17/34 | 463/43 |
| 2013/0005458 A1* | 1/2013 | Kosta | G07F 9/001 | 463/31 |
| 2013/0243248 A1* | 9/2013 | Vonolfen | H04N 5/2224 | 382/103 |
| 2013/0281188 A1* | 10/2013 | Guinn | G07F 17/323 | 463/25 |
| 2015/0302690 A1* | 10/2015 | Hutchinson-Kay | G07F 17/3272 | 463/42 |
| 2016/0098888 A1* | 4/2016 | Andres | G07F 17/326 | 463/22 |
| 2017/0178441 A1* | 6/2017 | Chun | G07F 17/322 | |
| 2019/0197821 A1* | 6/2019 | Hutchinson-Kay | G07F 17/3288 | |
| 2020/0005584 A1* | 1/2020 | Chun | G07F 17/3225 | |
| 2022/0092923 A1* | 3/2022 | Piazza | G07F 17/3241 | |
| 2022/0092943 A1* | 3/2022 | Piazza | G07F 17/3241 | |
| 2022/0223001 A1* | 7/2022 | Andres | G07F 17/3211 | |
| 2024/0338993 A1* | 10/2024 | Kim | G06F 3/011 | |
| 2024/0378946 A1* | 11/2024 | Robens | G07F 17/3211 | |
| 2025/0259504 A1* | 8/2025 | Russ | G07F 17/3293 | |

* cited by examiner

900

1000

PROVIDING LIVE DEALERS TO REMOTELY LOCATED TABLE GAMES

BACKGROUND

Embodiments described herein relate to network-connected wagering games, and in particular to providing live dealers to remote gaming tables in a casino environment, and related devices, systems, and methods. Table games in casinos may provide wagering opportunities for players at the tables for primary wagering games as well as side bets, side bets, or other secondary games. Live dealers for physical table games typically rotate among different tables in a single casino on a set schedule, making it difficult for players to play wagering games with specific dealers at specific times. There is a need for a unique technical solution to the technical problem of matching players with specific live dealers to enhance player enjoyment.

BRIEF SUMMARY

According to some embodiments, a system includes a processor circuit and a memory coupled to the processor circuit. The memory includes machine-readable instructions that, when executed by the processor circuit, cause the processor circuit to receive, from a remote gaming table, game information for a wagering game at the remote gaming table. The instructions further cause the processor circuit to capture, by an image capture device, live actions by a live dealer for the wagering game. The instructions further cause the processor circuit to transmit, to the remote gaming table, image information based on the captured live actions to provide a live holographic image of the dealer at the remote gaming table. The instructions further cause the processor circuit to receive, by an input device, game input from the live dealer. The instructions further cause the processor circuit to transmit, to the remote gaming table, game instructions based on the game input to execute game actions at the remote gaming table to generate a game result for the wagering game.

According to some embodiments, a system includes a processor circuit and a memory coupled to the processor circuit. The memory includes machine-readable instructions that, when executed by the processor circuit, cause the processor circuit to transmit, to a remote dealer location, game information for a wagering game at a gaming table. The instructions further cause the processor circuit to receive, from the remote dealer location, image information based on captured live actions of a live dealer. The instructions further cause the processor circuit to display, based on the image information, a live holographic image of the dealer at the gaming table. The instructions further cause the processor circuit to receive, from the remote dealer location, game instructions based on game input received from the live dealer. The instructions further cause the processor circuit to execute, based on the game instructions, game actions at the gaming table to generate a game result for the wagering game.

According to some embodiments, a method includes receiving, from a remote gaming table, game information for a wagering game at the remote gaming table. The method further includes capturing, by an image capture device, live actions by a live dealer for the wagering game. The method further includes transmitting, to the remote gaming table, image information based on the captured live actions to provide a live holographic image of the dealer at the remote gaming table. The method further includes receiving, by an input device, game input from the live dealer. The method further includes transmitting, to the remote gaming table, game instructions based on the game input to execute game actions at the remote gaming table to generate a game result for the wagering game.

DETAILED DESCRIPTION

Figure 1:
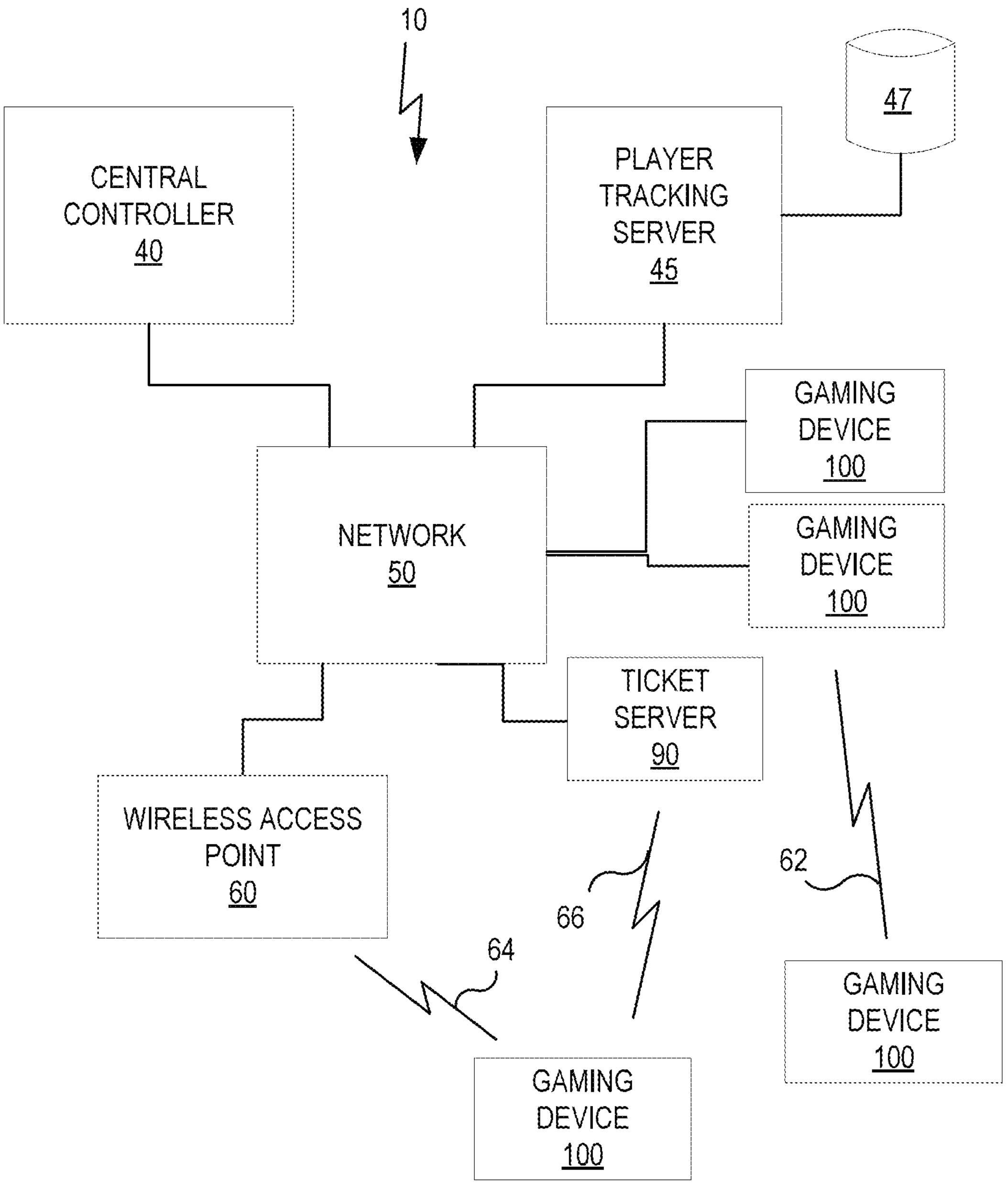
FIG. 1 is a schematic block diagram illustrating a network configuration for a plurality of gaming devices according to some embodiments.

Embodiments described herein relate to network-connected wagering games, and in particular to providing live dealers to remote gaming tables in a casino environment, and related devices, systems, and methods. Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
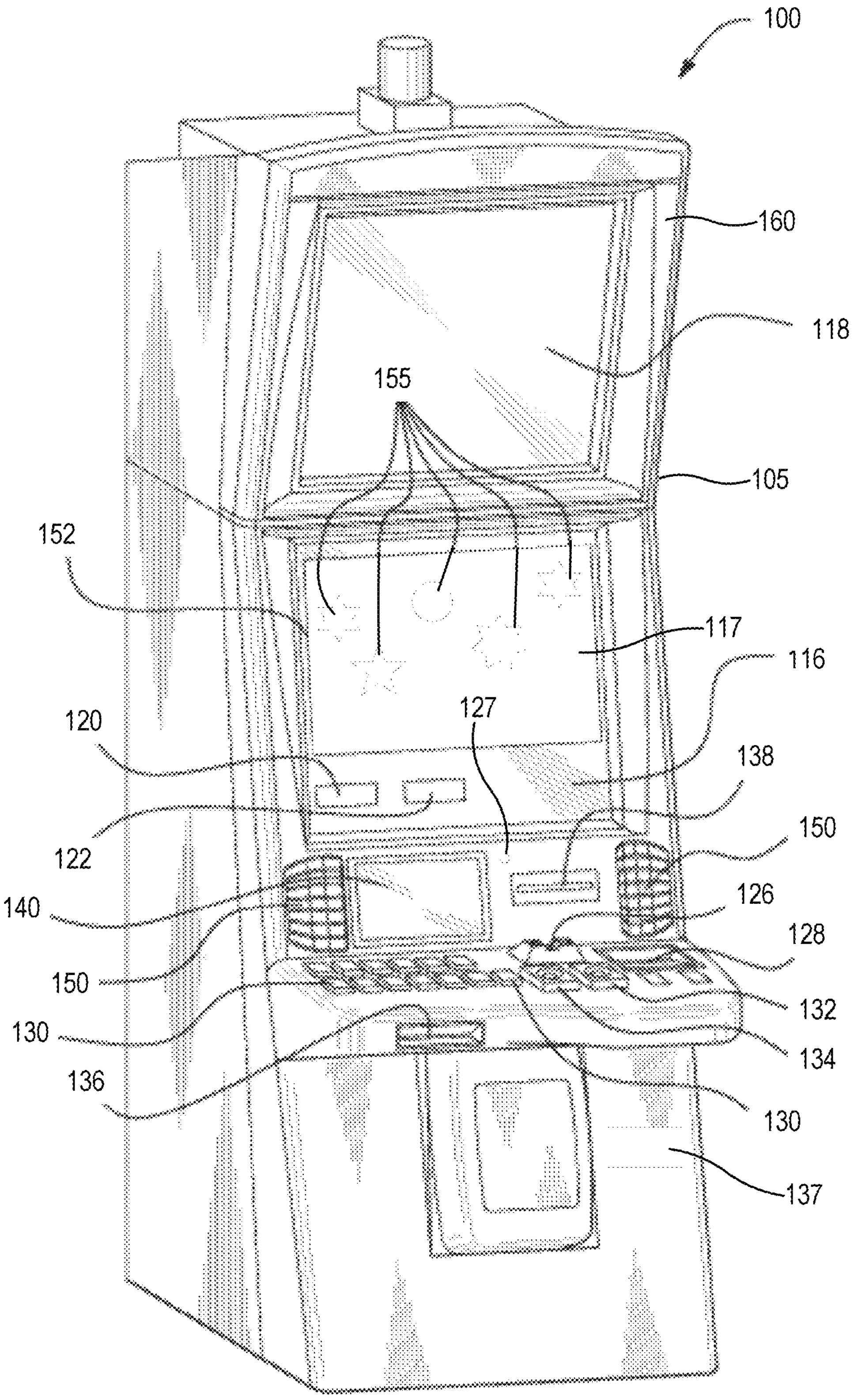
FIG. 2A is a perspective view of a gaming device that can be configured according to some embodiments.
Figure 2B:
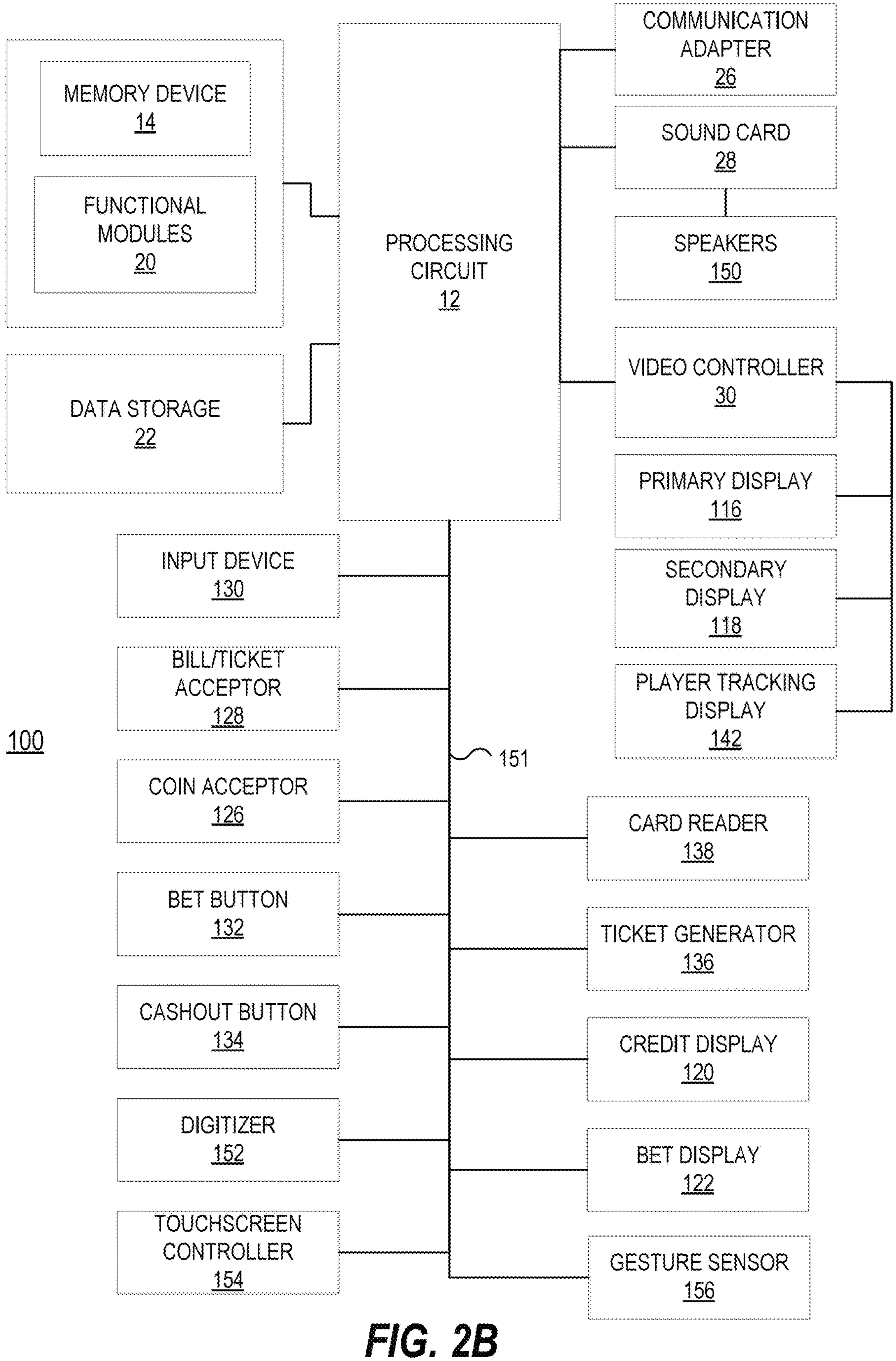
FIG. 2B is a schematic block diagram illustrating an electronic configuration for a gaming device according to some embodiments.
Figure 2C:
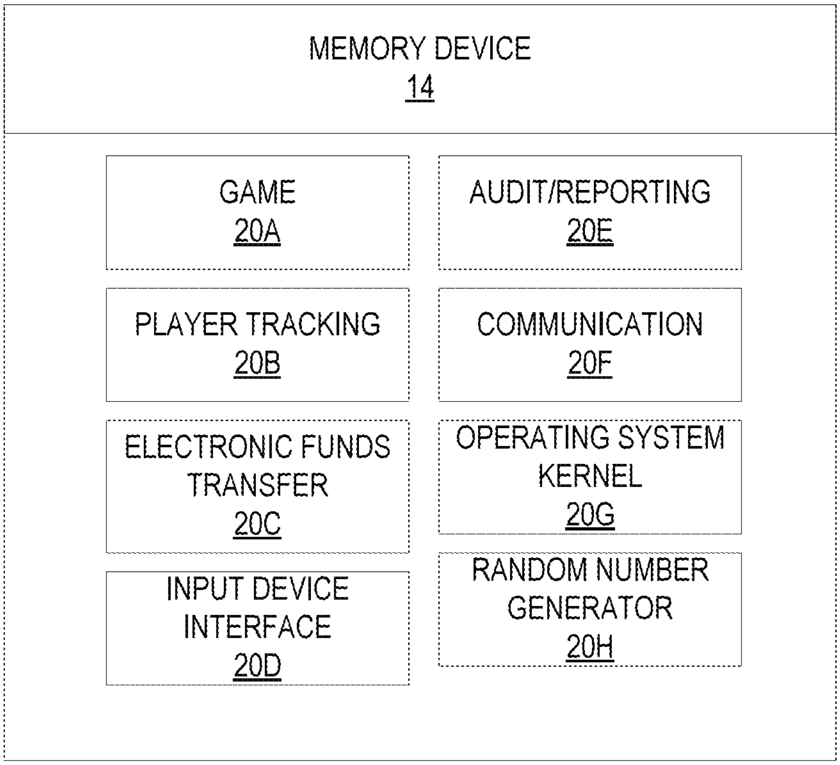
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIG. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
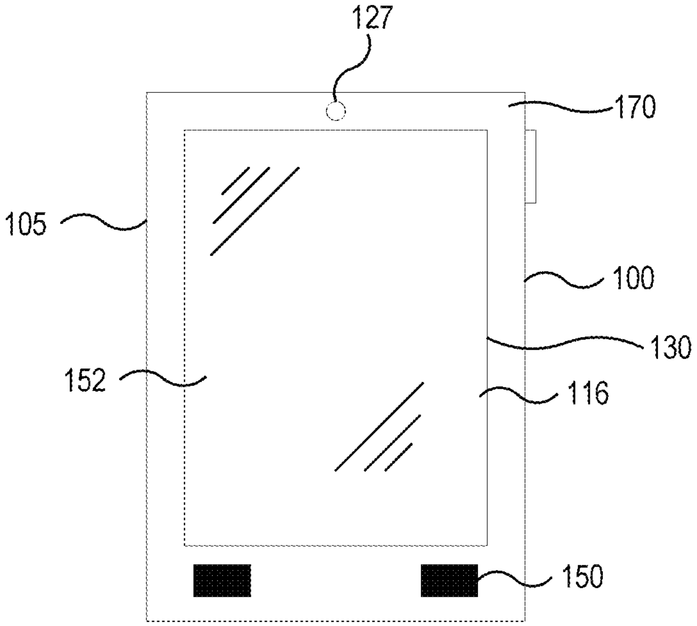
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
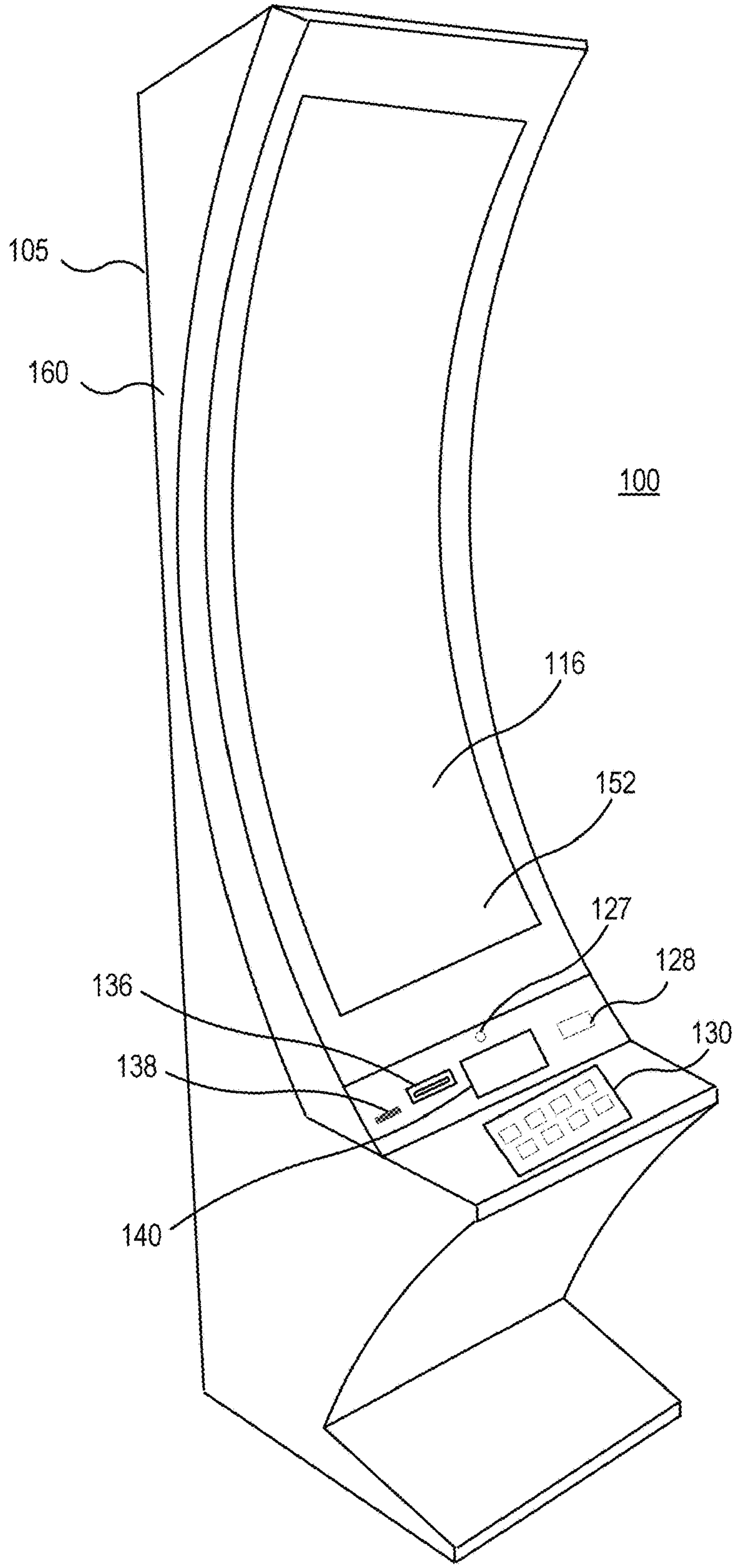
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
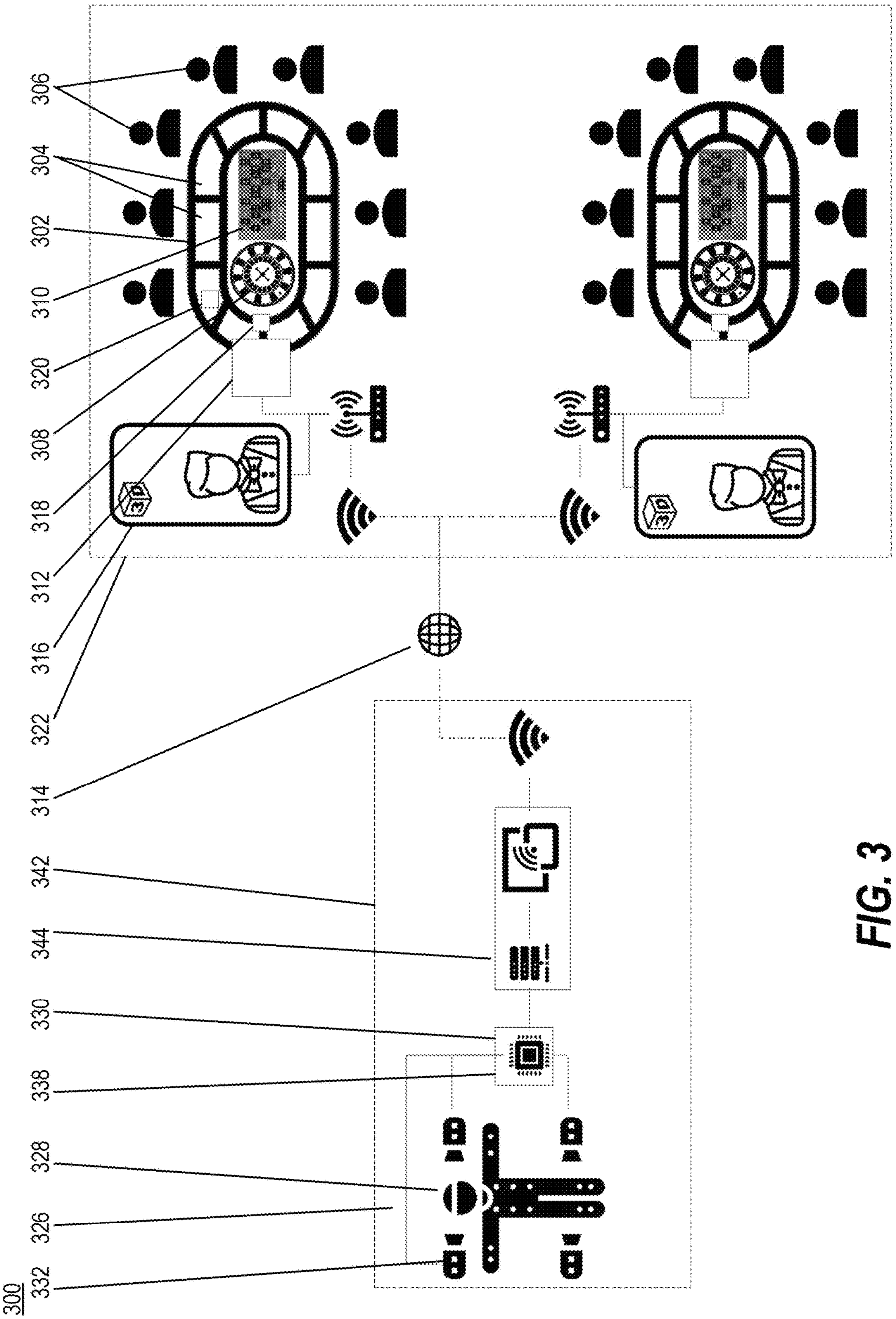
FIG. 3 illustrates a system for providing a live dealer remotely at one or more gaming tables in a casino environment, according to some embodiments.

FIG. 3 illustrates a system 300 for providing a live dealer 328 remotely at one or more gaming tables 302 in a casino environment, according to some embodiments. The system may include a plurality of remote gaming tables 302 each having a plurality of player positions 304 for a plurality of players 306. In this example, each table 302 is a roulette table with a physical roulette wheel 308 and a common betting area 310, but it should be understood that other types game tables may be used to provide different types of table games, as desired. Each table 302 includes a controller 312 connected to a network 314 for receiving display information for displaying real-time three dimensional (e.g., holographic) video of a live dealer 328 on a holographic display device 316. Each table 302 may include one or more audio output devices 318 and/or audio input devices 320 for facilitating one-way or two-way communication between the players 306 and the dealer 328 and/or other audio features, such as music and/or sound effects. The gaming tables 302 may be connected to each other directly and/or via one or more servers on a local network 322 (e.g., casino property network) and/or via the larger network 314 (e.g., operator network, Internet, etc.).

In this example, the live dealer 328 may be remotely located at a dealer location 326, which may be any network accessible location, as desired. The dealer location may include a streaming controller 330 and one or more video capture devices 332 for capturing the video of the live dealer 328 and providing the display information to the remote gaming tables 302 via the network 314. As with the tables 302, the dealer location may include one or more audio output devices and/or audio input devices for facilitating one-way or two-way communication between the players 306 and the dealer 328. The controller 330 may include an input device 338 for providing instructions and/or information relating to wagering games to the remote gaming tables 302. The dealer location 326 may be connected to other dealer locations directly and/or via one or more servers on a local network 342 and/or via the larger network 314. In some examples, the local network 342 may also include a video stream editing interface 344 for pre-processing, editing, and/or otherwise modifying the display information before transmitting the display information to the remote gaming tables 302.

In some embodiments, the one or more video capture devices 332 may capture a real-time three-dimensional recording of the dealer 328 to generate realistic virtual appearance for the dealer 328. The video stream may be modified to alter background content, clothes, features, etc. of the dealer 328. Communication via the network 342 may be via wired or wireless interfaces at the dealer location 326 and/or gaming tables 302, with appropriate encryption and/or other security measures. In some examples, the dealer 328 may interact with different tables 302 simultaneously and/or separately (e.g., in turn).

In some examples, the gaming tables 302 may provide physical table games and/or virtual table games (e.g., via an electronic table game). This may allow players 306 to participate with a single dealer 328 from different locations, such as within a casino at a physical or virtual table, and/or remotely, e.g., via a computing or mobile device. In some examples, physical elements such as the physical roulette wheel 308 may be replicated on other remote gaming tables 302. Alternatively, or in addition, different tables 302 may have different elements and/or interactions, such as different wheel 308 results, which may be managed and coordinated by the dealer 328 for example.

In some examples, game information for a wagering game at a remote gaming table 302 is received from the remote gaming table 302. An image capture device, e.g., capture device 332, may capture live actions by a live dealer 328 (e.g., at a remote dealer location 326) for the wagering game. Image information (such as a three-dimensional live holographic image) based on the captured live actions may be transmitted to the remote gaming table 302 to provide a live holographic image of the dealer 328 at the remote gaming table 302. In some examples, the live holographic image of the dealer 328 may include a three-dimensional animated avatar of the dealer 328.

Game input may be received from the dealer 328 by an input device 338, and game instructions based on the game input may be transmitted to the remote game table 302 to execute game actions at the remote gaming table 302 to generate a game result for the wagering game. In some examples, the game instructions may include instructions to confirm a winning game result for the wagering game to initiate payment of a game award to a player of the wagering game.

In some examples, the remote gaming table 302 may include a plurality of gaming tables 302, with game information and game instructions for game actions for different wagering games at the different gaming tables 302 being communicated between the dealer 328 and the different gaming tables 302.

In some examples, audio information from the remote gaming table corresponding to voice communication from a player of the wagering game may be played by an audio output device 334 and second audio information from the live dealer 328 corresponding to voice communication from the live dealer 328 may be received via an audio input device 336 for transmission to the remote gaming table 302 for playback at the remote gaming table 302. These and other features may facilitate interaction between the live dealer 328 and the players at the remote gaming table 302, such as audio communication, visual communication, written communication (e.g., text or graphical messages), and/or financial transactions such as a player betting on behalf of the dealer 328 and/or providing a gratuity or tip.

In some examples, players may be able to indicate particular live dealers as preferred dealers, for example, by storing the dealers in a preferences associated with a player account. In some examples, the player may be able to view a preferred dealer's schedule and/or availability, and/or may receive a notification (e.g., a phone alert) when a preferred dealer is working and/or available.

Figure 4:
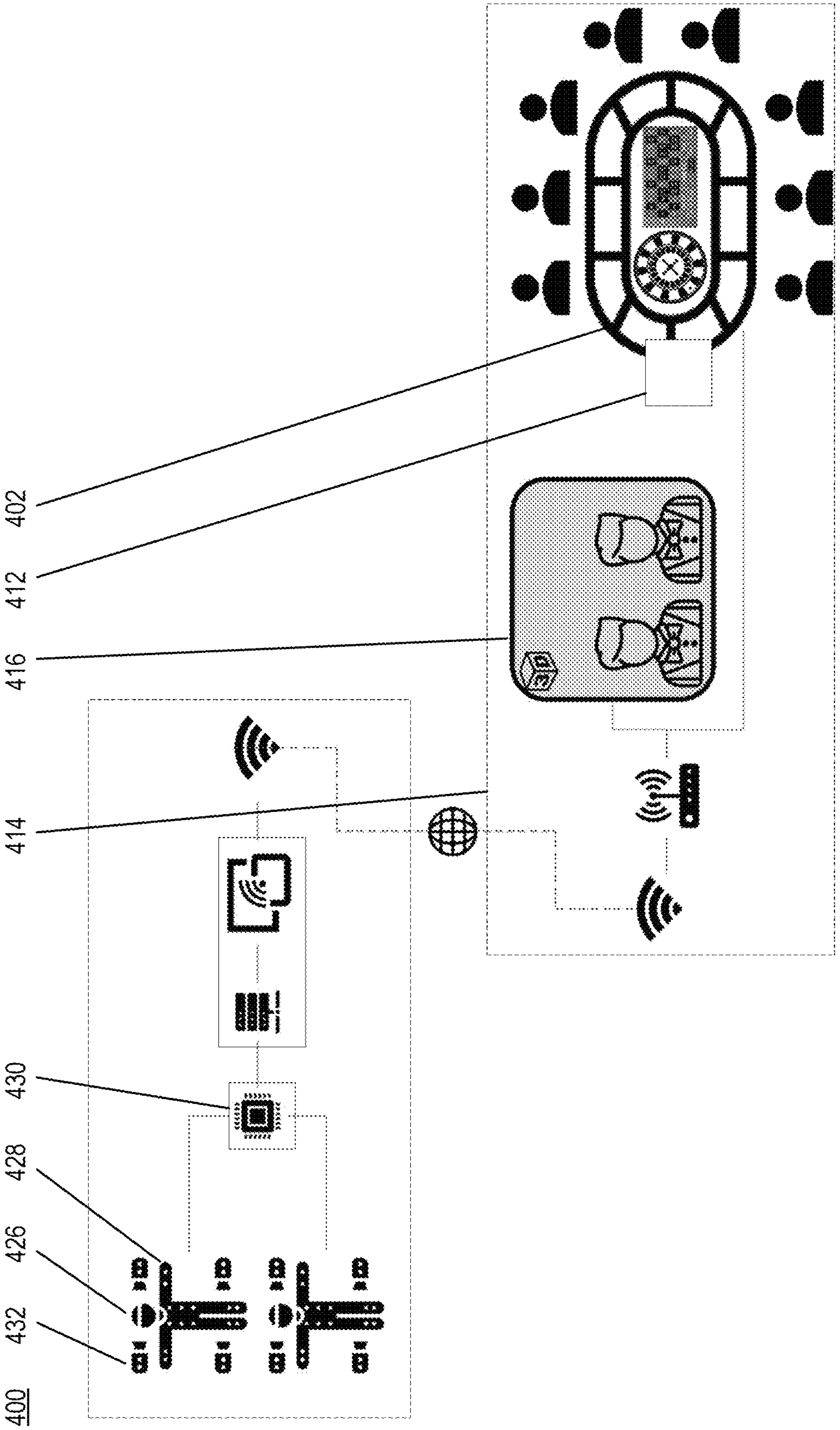
FIG. 4 illustrates a system for providing multiple live dealers remotely via a combined stream at the same gaming table in a casino environment, according to some embodiments.

FIG. 4 illustrates a system 400 for providing multiple live dealers 428 remotely via a combined stream at the same gaming table 402 in a casino environment, according to some embodiments. The table 402 includes a controller 412 connected to a network 414, one or more audio output devices and/or audio input devices, and a display device 416.

In this example, multiple live dealers 428 may be remotely located at a single dealer location 426, including a streaming controller 430, one or more audio output devices and/or audio input devices, and one or more video capture devices 432 for capturing the video of the live dealer 428 and providing the display information to the remote gaming table 402 via the network 414.

In this example, a single stream with both dealers 428 may be transmitted from the dealer location 426 to the one or more remote gaming tables 402. For example, the streaming controller 430 may process the video and/or audio for both dealers 428, add additional content, such as virtual content and/or informational content, and combine these and/or other elements into a single stream, e.g., with different active audio content based on which dealer 428 is speaking for example. For example, both dealers 428 may be visualized next to each other, talking to each other, etc. and are visible on one holographic display device 416 at each remote gaming table 402.

Figure 5:
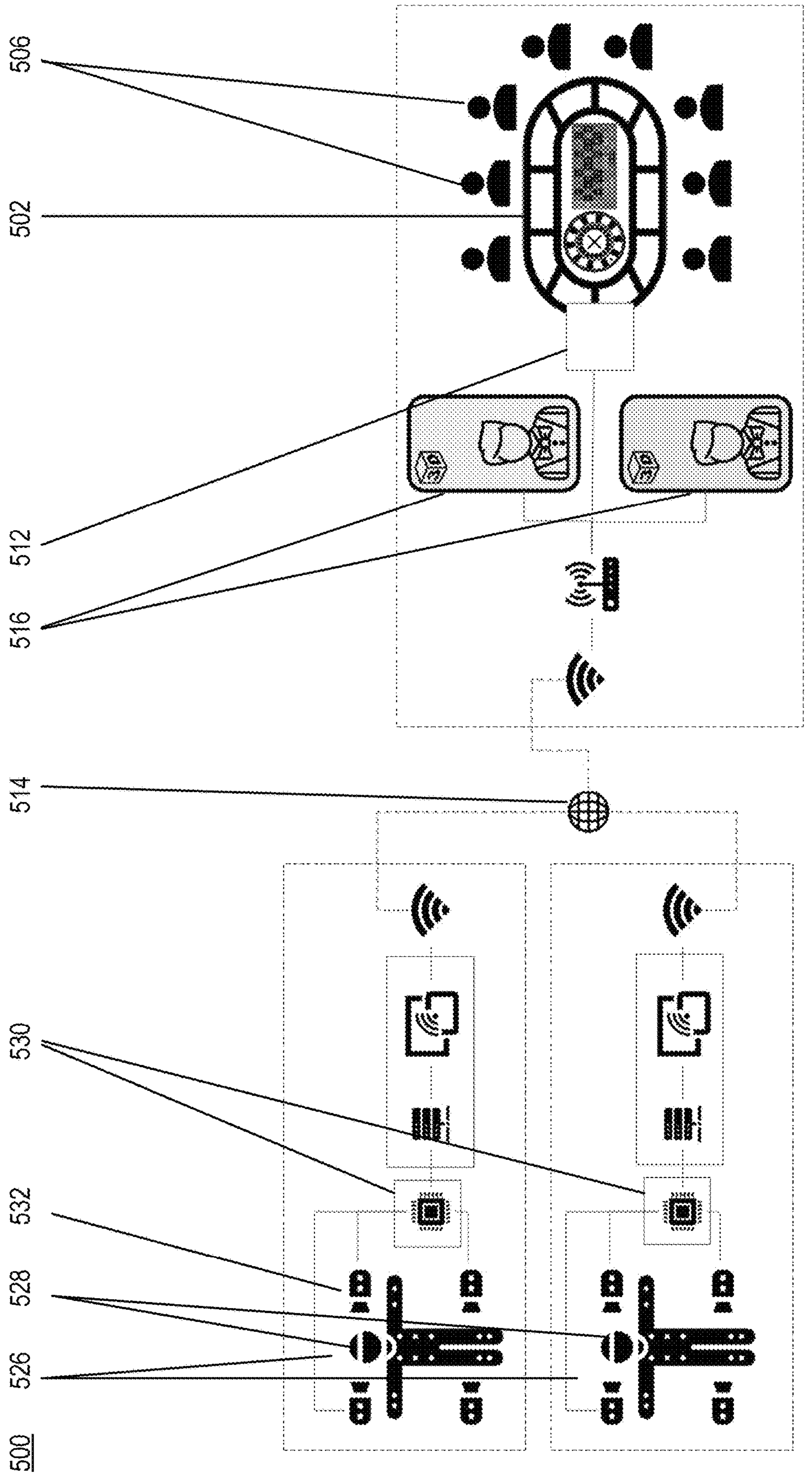
FIG. 5 illustrates a system for providing multiple live dealers remotely from different remote dealer locations in separate streams at the same gaming table in a casino environment, according to some embodiments.

FIG. 5 illustrates a system 500 for providing multiple live dealers 528 remotely from different remote dealer locations 526 in separate streams at the same gaming table 502 in a casino environment, according to some embodiments. The table 502 includes a controller 512 connected to a network 514, one or more audio output devices and/or audio input devices, and a display device 516.

In this example, multiple live dealers 528 may be remotely located at different dealer locations 526, each including a streaming controller 530, one or more audio output devices and/or audio input devices, and one or more video capture devices 532 for capturing the video of each live dealer 528 and providing the display information to the remote gaming table 502 via the network 514.

In this example, both dealers 528 may be visible at the display device 516 at the same time, and may be displayed independently from each other, interacting with each other and/or the players 506, switching back and forth, e.g., in response to game events associated with the different dealers 528, and/or based on player input, e.g., selecting a single dealer 528 from a group of available dealers 528.

Figure 6:
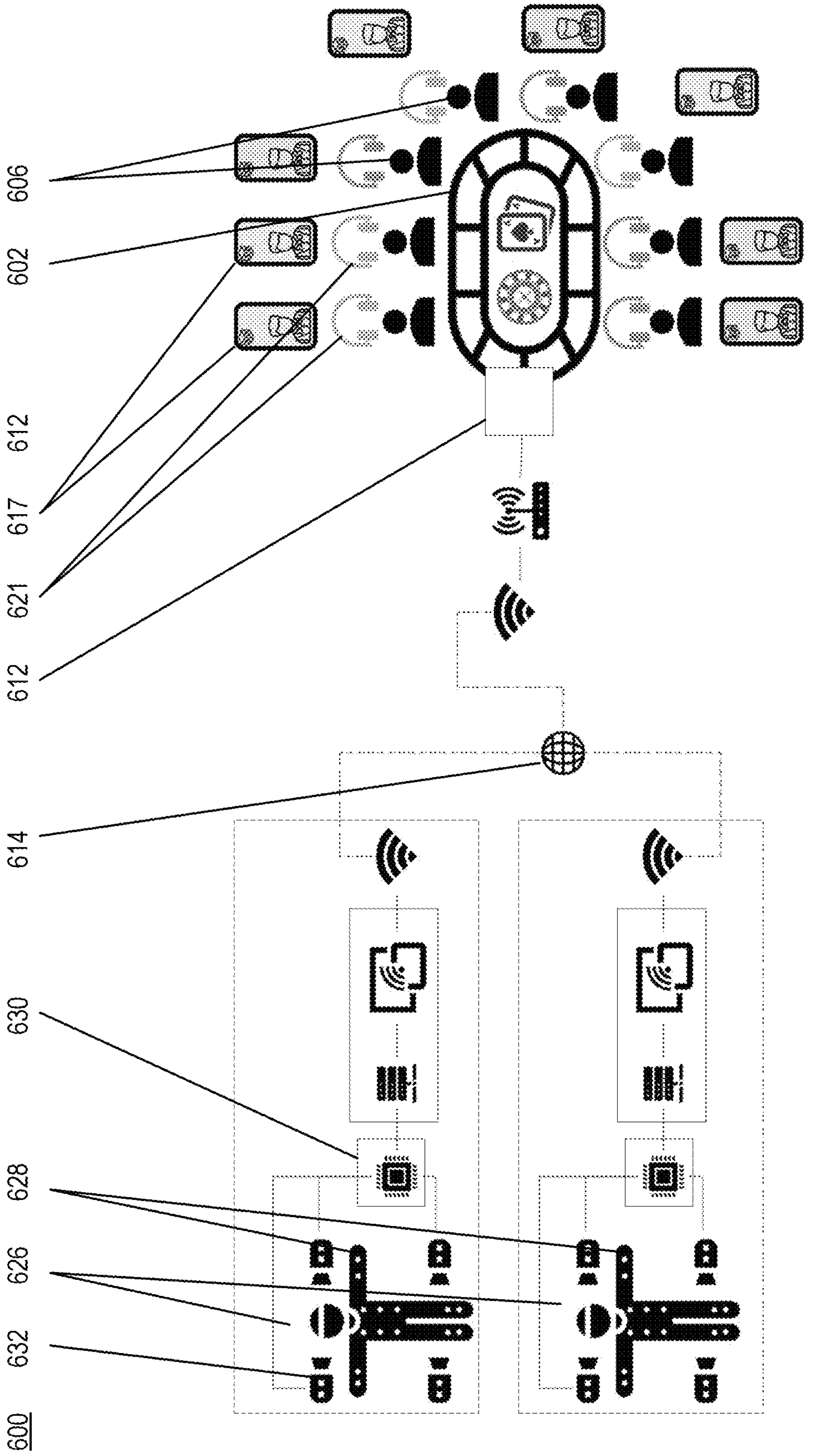
FIG. 6 illustrates a system for providing multiple live dealers remotely from different remote dealer locations in separate streams for different games being played simultaneously by different players at the same gaming table in a casino environment, according to some embodiments.

FIG. 6 illustrates a system 600 for providing multiple live dealers 628 remotely from different remote dealer locations 626 in separate streams for different games being played simultaneously by different players 606 at the same gaming table 602 in a casino environment, according to some embodiments. The table 602 includes a controller 612 connected to a network 614, one or more audio output devices and/or audio input devices, and a display device 616.

In this example, multiple live dealers 628 associated with the different games may be remotely located at the same or different dealer locations 626, each including a streaming controller 630, one or more audio output devices and/or audio input devices, and one or more video capture devices 632 for capturing the video of each live dealer 628 and providing the display information to the remote gaming table 602 via the network 614.

In this example, both dealers 628 may be visible at the display device 616 at the same time. Alternatively, different dealers 628 may be displayed at personal display devices 617 associated with individual players 606 based on which game each player 606 is playing. Each personal display device 617 may also be associated with an individual audio device 621, such as an individual audio output device, e.g., headphones, and/or individual audio input device, e.g., microphone, so that each player 606 can interact with a particular dealer 628 associated with a particular wagering game. In some examples, each player 606 may provide input for interacting with specific dealers 628, such as via a push-to-talk button. In some examples, the personal display device 617 and/or audio devices 621 may be provided via a mobile computing device interface, such as a phone associated with the player 606. In some examples, the personal display device 617 may be a terminal integrated into the gaming table 602. In some examples, personal display devices 617 may be shared among a subset of the players 606 at the table 602.

In this example, the different wagering games may be different instances of the same game type or may be different types of games, e.g., roulette and blackjack for example. In this manner, two different games may played independently and in parallel at the same game table 602, allowing for different groups of players 606.

In some examples, the controller 612 may transmit, to different remote dealer locations 626, game information for different wagering games associated with different players 606 at the gaming table 602, and may receive, from the remote dealer locations 626, image information based on captured live actions of the live dealers 628. In some examples, wagering games may be different instances of the same wagering game type, or may be different game types. The display device 616 may display, based on the image information, live holographic images of the dealers 628 at the gaming table 602. The controller 612 may also receive, from the remote dealer location 626, game instructions based on game input received from the live dealers 628 and execute, based on the game instructions, game actions at the gaming table 602 to generate game results for the different wagering game.

In some examples, the remote dealer location 626 may be a single location with both dealers 628 or may be different locations 626 with a different dealer 628 at each location 626.

Figure 7:
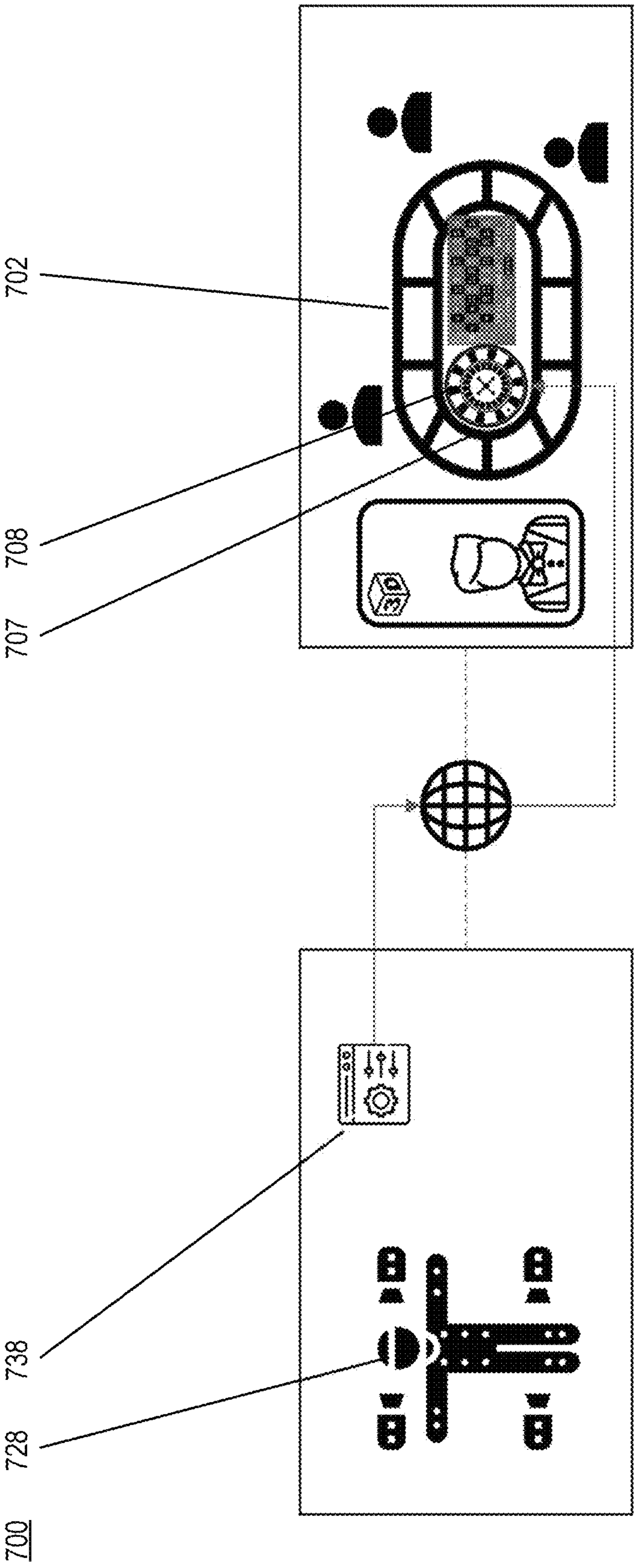
FIG. 7 illustrates a system for a remote dealer remotely controlling physical game objects such as a physical roulette wheel, according to some embodiments.

FIG. 7 illustrates a system 700 for a remote dealer 728 remotely controlling physical game objects 707 (e.g., a physical roulette wheel 708 in this example), according to some embodiments. In this example, the dealer 728 may remotely control the objects via an input device 738 at the remote dealer location 726. In this manner aspects of a physical table game having a plurality of physical game objects 707 may be controlled, with the game instructions including instructions to manipulate the physical game objects 707 at the remote gaming table 702 to generate the game result. For example, the instructions may cause a physical roulette wheel 708 at the remote gaming table 702 to spin, or may cause a card dealing device to deal a physical playing card at the remote gaming table 702, in some embodiments.

Figure 8:
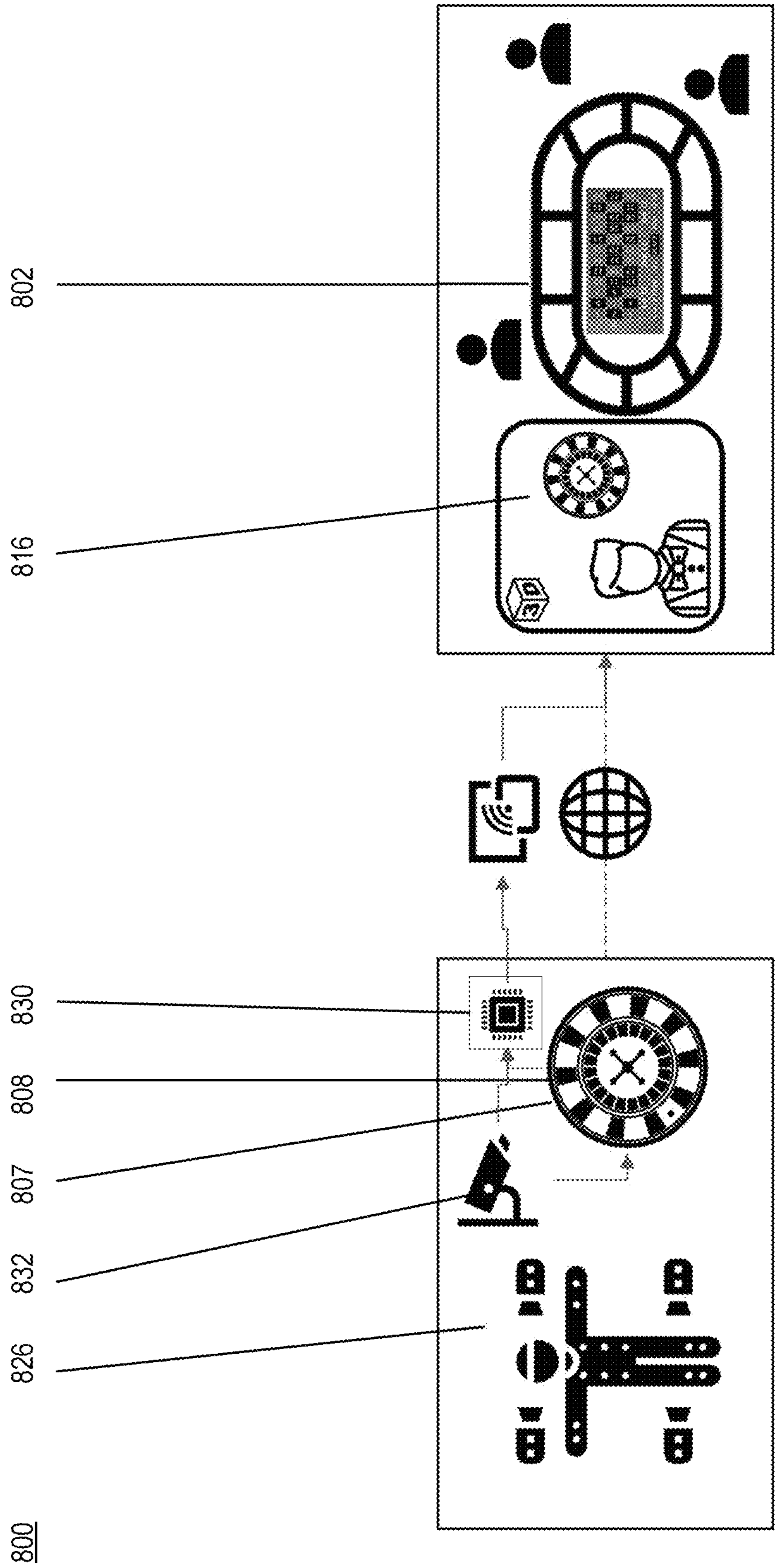
FIG. 8 illustrates a system for a remote dealer streaming an image of a physical game object such as a physical roulette wheel to the remote gaming table, according to some embodiments.

FIG. 8 illustrates a system 800 for a remote dealer 828 streaming an image of a physical game object 807 (such as a physical roulette wheel 808) to the remote gaming table 802, according to some embodiments. In this example, the video capture device 832 (or another capture device) at the remote dealer location 826 may also capture an image of the game object 807 and include the real time captured image of the object 807 in the stream that is displayed at a display device 816 at the remote gaming table 802. The streaming controller 830 may also detect a state of the object 807 (e.g., the wedge in which the roulette ball lands) and include the spin result in the stream. The stream of the dealer 828 and the object 807 may be a combined stream or separate streams, as desired, e.g., based on security, bandwidth, or other criteria for example.

Figure 9:
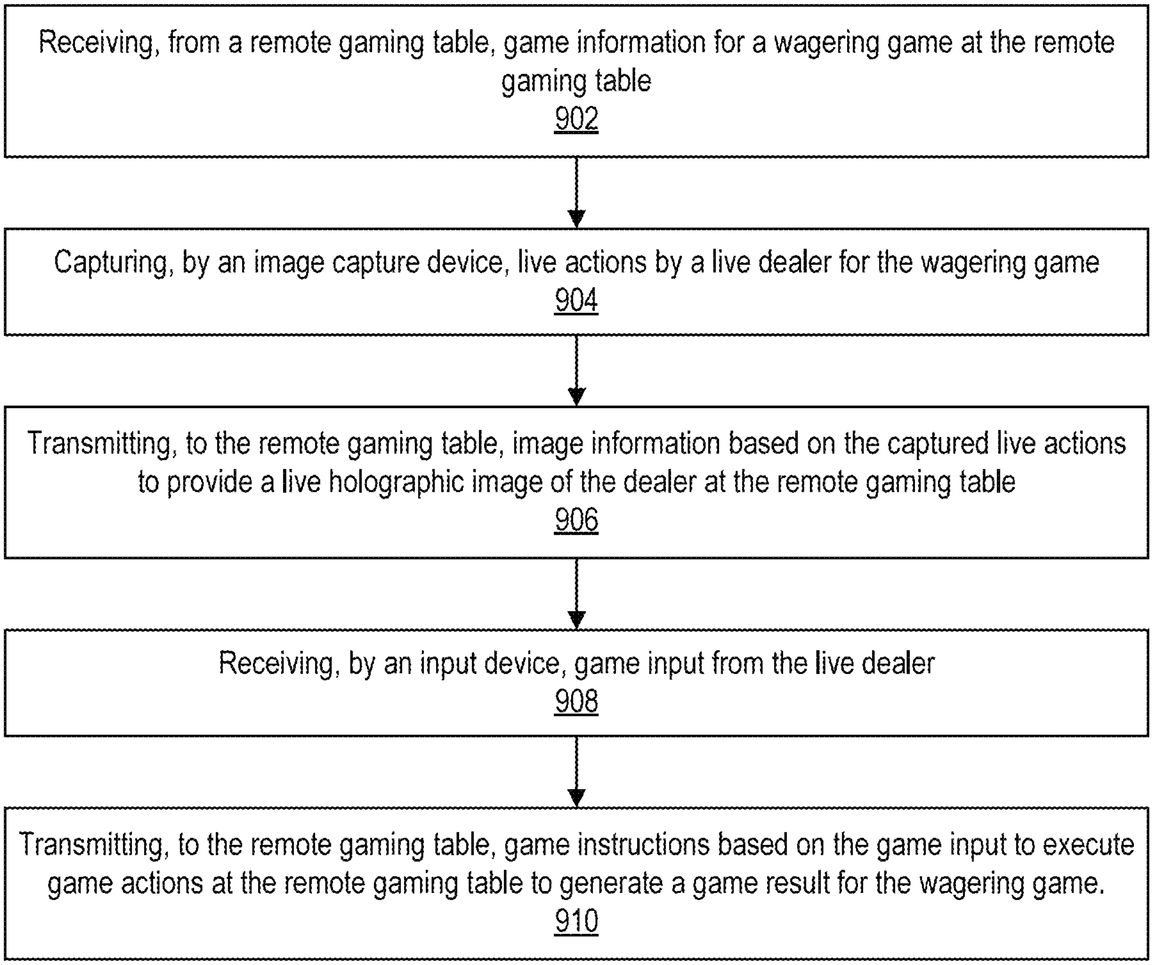
FIG. 9 is a flowchart illustrating operations of systems/methods for facilitating embodiments described herein.

FIG. 9 is a flowchart illustrating operations 900 of systems/methods for facilitating embodiments described herein. The operations 900 may be performed by one or more processor circuits of one or more computing devices, such as any of the computing devices described herein, for example. The operations 900 may include receiving, from a remote gaming table, game information for a wagering game at the remote gaming table (Block 902). The operations 900 may further include capturing, by an image capture device, live actions by a live dealer for the wagering game (Block 904). The operations 900 may further include transmitting, to the remote gaming table, image information based on the captured live actions to provide a live holographic image of the dealer at the remote gaming table (Block 906). The operations 900 may further include receiving, by an input device, game input from the live dealer (Block 908). The operations 900 may further include transmitting, to the remote gaming table, game instructions based on the game input to execute game actions at the remote gaming table to generate a game result for the wagering game (Block 910).

Figure 10:
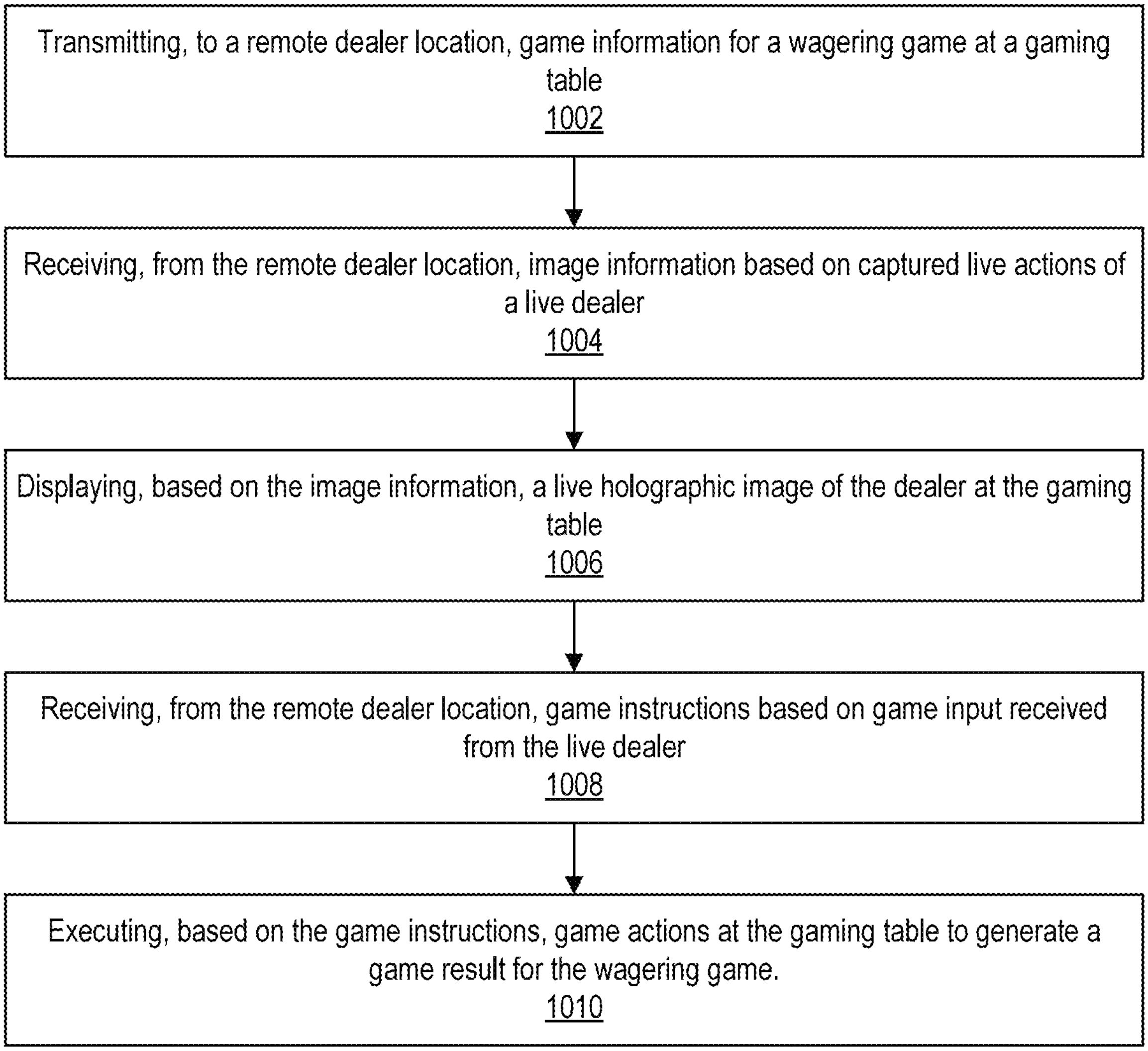
FIG. 10 is a flowchart illustrating operations of systems/methods for facilitating embodiments described herein.

FIG. 10 is a flowchart illustrating operations 1000 of systems/methods for facilitating embodiments described herein. The operations 1000 may be performed by one or more processor circuits of one or more computing devices, such as any of the computing devices described herein, for example. The operations 1000 may include transmitting, to a remote dealer location, game information for a wagering game at a gaming table (Block 1002). The operations 1000 may further include receiving, from the remote dealer location, image information based on captured live actions of a live dealer (Block 1004). The operations 1000 may further include displaying, based on the image information, a live holographic image of the dealer at the gaming table (Block 1006). The operations 1000 may further include receiving, from the remote dealer location, game instructions based on game input received from the live dealer (Block 1008). The operations 1000 may further include executing, based on the game instructions, game actions at the gaming table to generate a game result for the wagering game (Block 1010).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
- a processor circuit; and
- a memory coupled to the processor circuit, the memory comprising machine-readable instructions that, when executed by the processor circuit, cause the processor circuit to:
  - receive, from a remote gaming table via a network connection, game information for a wagering game at the remote gaming table;
  - capture, by a plurality of video capture devices in real time, live actions by a live dealer for the wagering game;
  - transmit, to the remote gaming table, image information based on the captured live actions to provide a live three-dimensional holographic image of the live dealer in real time at the remote gaming table via a holographic display device;

receive, by an input device, game input from the live dealer; and transmit, to the remote gaming table, game instructions based on the game input to execute game actions at the remote gaming table to generate a game result for the wagering game.

2. The system of claim 1, wherein the remote gaming table comprises a first remote gaming table and a second remote gaming table, wherein the game information comprises first game information for a first wagering game at the first remote gaming table and second game information for a second wagering game at the second remote gaming table, and wherein the game instructions comprise:

first game instructions to execute first game actions at the first remote gaming table to generate a first game result for the first wagering game; and second game instructions to execute second game actions at the second remote gaming table to generate a second game result for the second wagering game.

3. The system of claim 1, wherein the live three-dimensional holographic image of the live dealer comprises a three-dimensional live holographic image of the live dealer.

4. The system of claim 1, wherein the live three-dimensional holographic image of the live dealer comprises a three-dimensional animated avatar of the live dealer.

5. The system of claim 1, wherein the instructions further cause the processor circuit to:

play, via an audio output device, first audio information from the remote gaming table corresponding to voice communication from a player of the wagering game;

receive, via an audio input device, second audio information from the live dealer corresponding to voice communication from the live dealer; and transmit the second audio information to the remote gaming table for playback at the remote gaming table.

6. The system of claim 1, wherein the remote gaming table comprises a physical table game comprising a plurality of physical game objects.

7. The system of claim 6, wherein the game instructions comprise instructions to manipulate the physical game objects at the remote gaming table to generate the game result.

8. The system of claim 7, wherein the game instructions comprise instructions to cause a physical roulette wheel at the remote gaming table to spin.

9. The system of claim 7, wherein the game instructions comprise instructions to cause a card dealing device to deal a physical playing card at the remote gaming table.

10. The system of claim 1, wherein the remote gaming table comprises an electronic gaming table, and wherein the wagering game comprises an electronic table game.

11. The system of claim 1, wherein the game instructions comprise instructions to confirm a winning game result for the wagering game to initiate payment of a game award to a player of the wagering game.

12. A system comprising:

a processor circuit; and a memory coupled to the processor circuit, the memory comprising machine-readable instructions that, when executed by the processor circuit, cause the processor circuit to:

transmit, to a remote dealer location via a network connection, game information for a wagering game at a gaming table;

receive, from the remote dealer location, image information based on captured live actions of a live dealer captured by a plurality of video capture devices at the remote dealer location in real time;

display, based on the image information, a live three-dimensional holographic image of the live dealer in real time at the gaming table via a holographic display device;

receive, from the remote dealer location, game instructions based on game input received from the live dealer; and execute, based on the game instructions, game actions at the gaming table to generate a game result for the wagering game.

13. The system of claim 12, wherein the gaming table comprises a first gaming table and a second gaming table, wherein transmission of the game information to the remote dealer location comprises transmission of first game information for a first wagering game at the gaming table to a first remote dealer at the remote dealer location and transmission of second game information for a second wagering game at the gaming table to a second remote dealer at the remote dealer location.

14. The system of claim 13, wherein the first wagering game is associated with a first player at the gaming table and the second wagering game is associated with a second player at the gaming table.

15. The system of claim 13, wherein the first wagering game is a first wagering game type associated with a player at the gaming table, and the second wagering game is a second wagering game type different from the first wagering game type associated with the player at the gaming table.

16. The system of claim 13, wherein the remote gaming location comprises a first remote gaming location associated with the first remote dealer and a second remote gaming location associated with a second dealer.

17. The system of claim 12, wherein the live three-dimensional holographic image of the live dealer comprises a three-dimensional live holographic image of the live dealer.

18. The system of claim 12, wherein the live three-dimensional holographic image of the live dealer comprises a three-dimensional animated avatar of the live dealer.

19. The system of claim 12, wherein the instructions further cause the processor circuit to:

receive, via an audio input device, first audio information corresponding to voice communication from a player of the wagering game;

transmit the first audio information to the remote dealer location for playback at the remote dealer location; and play, via an audio output device, second audio information from the remote dealer location corresponding to voice communication from the live dealer.

20. A method comprising:

receiving, from a remote gaming table via a network connection, game information for a wagering game at the remote gaming table;

capturing, by a plurality of video capture devices in real time, live actions by a live dealer for the wagering game;

transmitting, to the remote gaming table, image information based on the captured live actions to provide a live three-dimensional holographic image of the live dealer in real time at the remote gaming table via a holographic display device;

receiving, by an input device, game input from the live dealer; and transmitting, to the remote gaming table, game instructions based on the game input to execute game actions at the remote gaming table to generate a game result for the wagering game.

* * * * *